United States Patent Office 3,254,429
Patented June 7, 1966

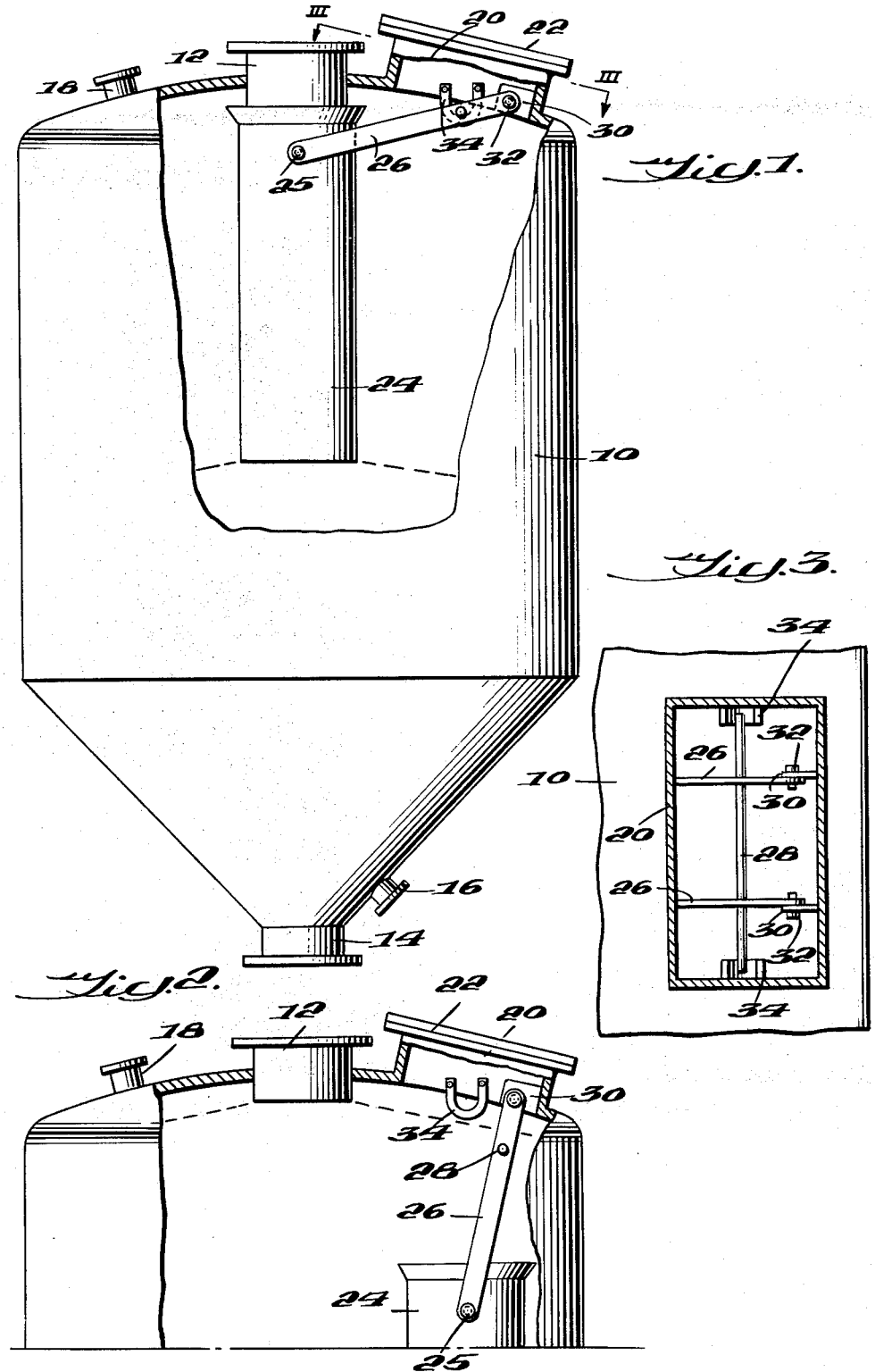

3,254,429
DRYING VESSEL
Richard Donnan Livingston, Seaford, Del., assignor to E. I. du Pont de Nemours and Company, Wilmington, Del., a corporation of Delaware
Filed July 29, 1963, Ser. No. 298,379
2 Claims. (Cl. 34—168)

This invention relates to the processing of time-sensitive materials and, more particularly, to an apparatus for changing residence time in a container for such time-sensitive materials.

During the preparation of useful polymeric articles, it is necessary to condition the polymer before it is melted for extrusion or spinning. During this conditioning, the polymer (in solid state) is dried in a conditioner vessel wherein it can experience some thermal degradation.

When the polymer throughput rate varies, polymer residence times extend into ranges wherein either insufficient drying or overdrying occurs. For example, holdup time of less than two hours for polyhexamethylene adipamide flake results in nonuniform and insufficient over-all drying, while holdup time much in excess of ten hours for such flake results in exceedingly difficult equipment operation as well as nonuniform product. Known flake conditioners have been designed for maximum polymer throughput and are relatively ineffective at low polymer throughputs.

The principal object of this invention is an apparatus for continuously conditioning a time-sensitive material over a wide range of throughput rates.

Another object of this invention is an apparatus for controlling residence time during the conditioning of a time-sensitive material over a wide range of throughput rates.

These objectives are achieved with an upright vessel provided with a flake inlet conduit extending through its top, a flake outlet at the bottom and a fitting situated adjacent the outlet for admitting a gaseous conditioning medium. Within the vessel, there is provided an extension tube which is shiftable to and from a position of alignment with the inlet conduit.

Other objectives will be apparent from the following description wherein reference is made to the accompanying drawing in which:

FIGURE 1 is a side view of the conditioner, parts having been broken away and shown in section to reveal details of construction;

FIG. 2 is a fragmentary side view showing the inlet extension in the nonaligned position; and FIG. 3 is a fragmentary sectional view taken on line III—III in FIG. 1.

In the illustrated embodiment, an upright conditioner vessel 10 is provided with flanged flake inlet and outlet conduits 12, 14, inlet and outlet fittings 16, 18 for a drying gas and a rectangular access hatch 20, which is normally covered by a plate 22. Vessel 10 receives flake from a supply hopper and discharges to a screw conveyor, screw melter, conveyor belt or other materials handling equipment. The rate of throughput is set according to the desired rate of advance through such materials handling equipment.

As illustrated, vessel 10 is equipped with a tubular extension 24 having opposed pins 25 on which a pair of arms 26 is pivoted. Arms 26 are held in a spaced, parallel relationship by a bar 28 to which they are affixed and are pivoted to spaced brackets 30 in hatch 20 by removable pins 32. When extension 24 is aligned with inlet conduit 12, the ends of bar 28 rest in spaced U-shaped supports 34, entering flake passes through extension 24 and the flake is maintained at the minimum content level shown in FIG. 1. Extension 24 can be shifted simply by shutting off the flow of flake through conduit 12, removing plate 22 and pins 32, lifting bar 28 clear of supports 34, repositioning the extension in the alternate position and reopening conduit 12. Flake rises quickly to the maximum content level shown in FIG. 2. To facilitate close control of residence time and, therefore, of flake moisture content, replacement extensions 24 having different lengths may be provided.

All parts to be located inside of the conditioner vessel should be strong, light in weight and of such material that no significant chemical reaction will take place with the atmosphere or with the contents of the conditioner vessel. When polyhexamethylene adipamide is being processed, Type 304 stainless steel is the preferred material.

Certain operational advantages of the illustrated apparatus are described in the following example.

EXAMPLE

In the conditioning of polyhexamethylene adipamide flake, a 5700 pound maximum capacity conditioner vessel is equipped with an inlet extension of the type shown in FIG. 1. The throughput rate is varied from first, 740 pounds per hour, then 370 pounds per hour, and finally 270 pounds per hour. As control, the same throughput rates are effected with the inlet extension positioned as shown in FIG. 2. The results of these tests are recorded in the following table.

Table

| Flake Throughput (lbs./hr.) | Residence Time (hours) | |
|---|---|---|
| | With Extension Apparatus | Without Extension Apparatus |
| 270 | 11.6 | 20.7 |
| 370 | 8.6 | 15.3 |
| 740 | 4.3 | 7.7 |

The operation of the equipment with the inlet extension is trouble-free, and the degradation of the flake in the vessel is unexpectedly maintained at excellent, low levels. In contrast, when the conditioner vessel is used without an extension 24, the product has unacceptable moisture uniformity when the throughput rate is lowered to 370 pounds per hour and, at 270 pounds per hour, the moisture is even less uniform. Optimum holdup time for 6-6 nylon is within the range of 3.6 to 8.7 hours.

It is apparent that many variations and modifications of the disclosed apparatus may be accomplished without departing from the spirit of the present invention which is accordingly intended to be limited only by the scope of the appended claims.

Having thus described the invention, what is claimed as new and desired to be secured by Letters Patent is:

1. A flake conditioner comprising: an upright vessel having a normally closed access hatch and a funnel-shaped bottom wall; a flake inlet conduit extending through the top of and into the interior of said vessel; a flake outlet in said bottom wall; a fitting situated adjacent said outlet for the admission of a gaseous conditioning medium; an extension tube for said inlet conduit; and releasable means supporting said tube, within said vessel, in alternate positions of alignment or nonalignment with said inlet conduit.

2. The flake conditioner of claim 1 wherein said supporting means comprises a pair of elongated arms each pivotally attached at one end thereof to said tube, means releasably attaching the arms at their opposite ends to said vessel adjacent said access hatch and spaced supports for the arms when said tube is aligned with the inlet conduit, the arms and said tube being suspended from said releasable attachment means when in the nonaligned position.

References Cited by the Examiner

UNITED STATES PATENTS

| 34,379 | 2/1862 | Strong. | |
|---|---|---|---|
| 455,328 | 7/1891 | Herbert | 214—17.6 X |
| 2,621,105 | 12/1952 | Bearer et al. | 34—167 |
| 2,728,995 | 1/1956 | Schaub | 34—168 X |

FOREIGN PATENTS

| 348,744 | 5/1931 | Great Britain. |
|---|---|---|

WILLIAM F. O'DEA, *Primary Examiner.*

NORMAN YUDKOFF, *Examiner.*

J. SOFER, B. L. ADAMS, *Assistant Examiners.*